(12) United States Patent
Asada et al.

(10) Patent No.: US 6,236,037 B1
(45) Date of Patent: May 22, 2001

(54) FINGER TOUCH SENSORS AND VIRTUAL SWITCH PANELS

(75) Inventors: Haruhiko H. Asada, Lincoln; Stephen Mascaro, Somerville; Kuo-Wei Chang, Lexington, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/253,437

(22) Filed: Feb. 19, 1999

Related U.S. Application Data
(60) Provisional application No. 60/075,279, filed on Feb. 20, 1998, and provisional application No. 60/079,866, filed on Mar. 30, 1998.

(51) Int. Cl.[7] .................................................. G01L 5/22
(52) U.S. Cl. .............................................................. 250/221
(58) Field of Search ................................ 250/221, 231.19

(56) References Cited

U.S. PATENT DOCUMENTS

| | | | |
|---|---|---|---|
| 4,825,872 | 5/1989 | Tan et al. | 128/633 |
| 4,830,014 | 5/1989 | Goodman et al. | 128/665 |
| 5,088,817 | * 2/1992 | Igaki et al. | 356/71 |
| 5,224,478 | 7/1993 | Sakai et al. | 128/633 |
| 5,479,528 | 12/1995 | Speeter | 382/115 |
| 5,581,484 | 12/1996 | Prince | 364/559 |
| 5,612,689 | 3/1997 | Lee, Jr. | 341/20 |
| 5,686,905 | 11/1997 | Murata et al. | 340/825.79 |
| 5,703,623 | 12/1997 | Hall et al. | 345/158 |
| 5,751,835 | 5/1998 | Topping et al. | 382/115 |
| 5,776,059 | 7/1998 | Kaestle et al. | 600/340 |
| 5,792,052 | 8/1998 | Isaacson et al. | 600/323 |

FOREIGN PATENT DOCUMENTS

| | | |
|---|---|---|
| 2 305 714 | 4/1997 | (GB) . |
| WO 93/15476 | 8/1993 | (WO) . |

* cited by examiner

*Primary Examiner*—F. L. Evans
(74) *Attorney, Agent, or Firm*—Bromberg & Sunstein LLP

(57) ABSTRACT

A device for detecting contact pressure applied to a finger, the finger having a fingernail illuminated by light, comprises at least one photodetector for measuring a change in light reflected by an area of the finger beneath the fingernail in response to the contact pressure applied to the finger. The photodetector provides a signal corresponding to the change in light reflected. The device also includes a processor for receiving the signal and determining whether the change corresponds to a specified condition. The photodetector may be enclosed in a housing and coupled to the fingernail.

11 Claims, 9 Drawing Sheets

US 6,236,037 B1

FINGER TOUCH SENSORS AND VIRTUAL SWITCH PANELS

The present application claims priority from U.S. provisional application number 60/075,279, filed Feb. 20, 1998, and U.S. provisional application number 60/079,866, filed Mar. 30, 1998, both of which applications are herein incorporated by reference.

This invention was made with government support under Grant Number DAMD17-98-2-8003 awarded by the U.S. Army. The government has certain rights in the invention.

TECHNICAL FIELD

The present invention relates generally to sensory feedback devices and, more particularly, the invention relates to sensors for detecting human touch.

BACKGROUND

Data gloves have been extensively studied in the past decade in the robotics and virtual reality communities. There are many ways of providing force feedback to a human from a virtual environment or from sensors on a robot, and many data gloves now make use of such force feedback. However, few data gloves collect touch-force data from the human fingers as the human interacts with the environment. To measure the forces acting at the fingers, for example, sensor pads comprising conductive rubber, capacitive sensors, and/or optical detectors can be placed between the fingers and the environment surface. These sensor pads, however, inevitably deteriorate the human haptic sense since the fingers cannot directly touch the environment surface. Moreover, sensor pads may deteriorate or wear out due to mechanical contacts.

Data glove based input has also been used increasingly in the last decade for teleoperation and other forms of human-machine interaction. Postural gesture recognition has been applied to the teleoperation of robots and the teaching of robots by demonstration and guiding. Some systems have been developed for teaching and guiding by inferring human intentions by tactile gestures, which were measured by force sensors on the robots. However, such a system is not very flexible, as it requires modification of the hardware on the robot.

SUMMARY

In accordance with one aspect of the invention, a device for detecting contact pressure applied to a finger, the finger having a fingernail illuminated by light, comprises at least one photodetector for measuring a change in light reflected by an area of the finger beneath the fingernail in response to the contact pressure applied to the finger and providing a signal corresponding to the change and a processor for receiving the signal and determining whether the change corresponds to a specified condition. In a preferred embodiment, the photodetector is an array of photodetectors, the array of photodetectors having a spectral range. The spectral range may include visible and infrared wavelengths.

In another embodiment, the device further includes at least one light source, coupled to the photodetector, the light source for emitting light into the fingernail. In a preferred embodiment, the device further includes a set of light sources coupled to the photodetector, the set of light sources having varying wavelengths and for emitting light into the fingernail. In a further embodiment, the device further includes a housing, enclosing the photodetector and a coupling element, connected to the housing, the coupling element for coupling the housing to the fingernail. In a preferred embodiment, the coupling element is a transparent adhesive material. In yet another embodiment, the device further includes a surface for providing contact pressure to the finger, the surface having indicia and a position locator in signal communication with the processor and coupled to the finger, the position locator for identifying the position of the finger in relation to the surface.

In accordance with another aspect of the invention, a method for detecting contact pressure applied to a finger, the finger having a fingernail illuminated by light, comprises providing at least one photodetector, measuring a change in light reflected by an area of the finger beneath the fingernail in response to the contact pressure applied to the finger, providing a signal corresponding to the change and comparing the change and a specified condition. In a preferred embodiment, the method further includes illuminating the fingernail with light from a light source. In an alternative embodiment, the method further includes enclosing the photodetector and the light source in a housing and coupling the housing to the fingernail.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

A new approach to the detection of finger forces is presented in order to eliminate the impediment for the natural haptic sense. Namely, a finger force is measured without having to place a sensor pad between the finger skin and the environment surface. Specifically, finger force is detected by an optical sensor mounted on the fingernail. This allows a person to touch the environment with bare fingers and perform fine, delicate tasks using the full range of haptic sense. Furthermore, unlike known finger touch-force sensors, preferred embodiments of the sensor should last for a longer time since such sensors do not contact the environment and have no mechanical parts to wear or become damaged due to mechanical contacts.

First, the configuration of a touch sensor circuit is described. Note that other electrical configurations of the sensor may be utilized to detect contact pressure in accord with preferred embodiments of the invention. Accordingly, the specific electrical circuits merely show preferred implementations of a touch sensor circuit. Second, the preferred embodiments of a device for detecting contact pressure applied to a finger will be discussed. Once the preferred embodiments of the invention are discussed, applications of the preferred embodiments are discussed in conjunction with a cooperative human-robot control system to monitor human behavior.

As a finger is pressed horizontally on a surface with increasing force, a sequence of color changes is observed through the fingernail. FIGS. 1a–1d schematically show a series of typical color changes observable through a fingernail in response to a force applied to a finger. As shown in FIGS. 1a–1d, the area of the finger beneath the fingernail changes color from pale red to a more intense red with increasing force applied to the finger. In fact, the color change visible through the fingernail is characteristically non-uniform across the nail, resulting in distinct patterns of color change. FIGS. 1a–1d are an example of possible forces applied to a finger and the change in color visible through a fingernail in response to the applied forces. Although the color change may vary from person to person, the underlying physiological principle is universally applicable for a healthy finger and fingernail in an ordinary environment. This principle will now be discussed with respect to FIGS. 1a–1d.

Figure 1A:
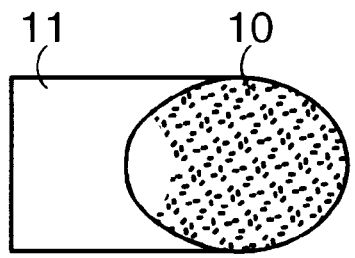
FIGS. 1a–1d schematically show a series of typical color changes visible through a fingernail in response to a force applied to a finger.
Figure 1B:
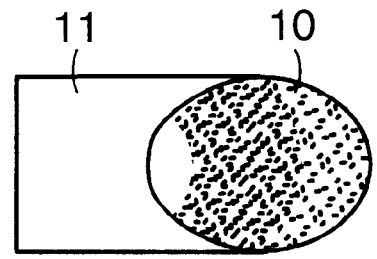

In FIG. 1a, when a force below a first threshold, for example 0.3 N, is applied to a finger the entire area beneath the fingernail 10 begins to redden in color. The dermis becomes richly vascularized with large arteriovenous shunts. As forces greater than the first threshold are applied to the finger, the venus return of blood in the fingertip is progressively constricted. This results in the pooling of arterial blood in the capillaries underneath the fingernail 10 and cause the area beneath the fingernail 10 to become darker red in color as shown in FIG. 1b. The arterial blood which pools underneath the fingernail 10 is rich in oxy-hemoglobin and therefore, bright red in color. When the force applied reaches a second threshold, for example 1N, the vein will be completely blocked and the color observable through the fingernail stops reddening with further increase in contact pressure.

Figure 1C:
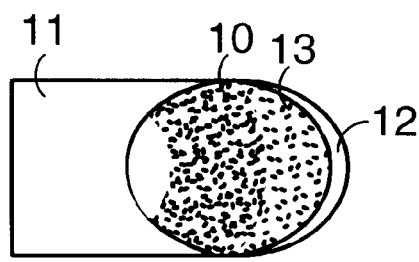
Figure 1D:
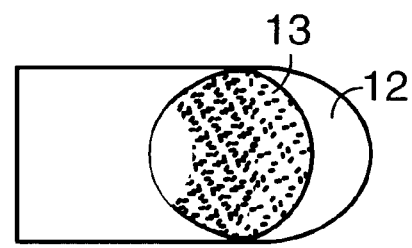

If, however, the force applied is further increased above the second threshold, as shown in FIG. 1c, the arterial supply at the tip of the finger will be constricted causing the blood to be pushed out of this region, resulting in a white band 12 at the tip of the finger. The rest of the fingernail 13 remains deep red, as the capillaries are protected from the pressure of the touch force by the bone of the distal phalanx 11, which is connected to the fingernail via a strong matrix of collagen and elastic fibers. The condition, as shown in FIG. 1c, will occur as the force applied is between the second threshold and a third threshold, for example between 1N and 4N. If the force applied to the finger is increased above the third threshold, for example 4N, the white band 12 widens until some limit is reached as shown in FIG. 1d. Further increases in contact pressure beyond this limit will have no further visible effect. However, forces applied longitudinally to the front of the fingertip and shear forces along the same direction are more effective at exerting stresses on the tissue above the bone and are therefore capable of increasing the white band 12 even further.

The above described phenomena may be utilized to measure touching force and contact pressure by monitoring changes in the color of the area of the finger beneath the fingernail without having to put a sensor between the finger and a surface. The change in color is directly related to the pooling of arterial blood and its oxy-hemoglobin saturation (relative concentrations of oxy- and reduced-hemoglobin). In accordance with a preferred embodiment of the invention, the amount of blood and the oxygen (oxy-hemoglobin) saturation under the fingernail bed can be monitored by shining light into the fingernail and measuring the reflectance. This technique is termed "photo-plethysmography."

Figure 2A:
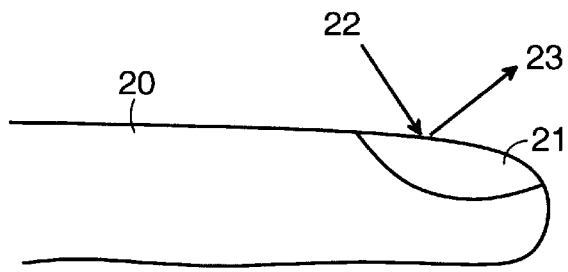
FIG. 2a schematically shows a fingernail touch sensor circuit that may be utilized in accordance with an embodiment of the invention.
Figure 2A:
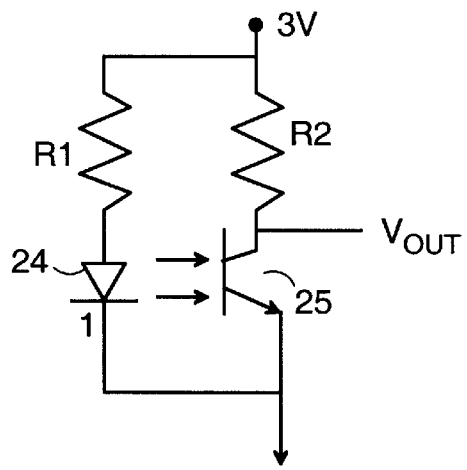

An embodiment of a "touch sensor" circuit is shown in FIG. 2a. A light source 24 transmits light 22 into a fingernail 21 of a finger 20. In the embodiment shown in FIG. 2a, the light source 24 is a red light emitting diode ("LED") at 660 n.m. which illuminates the fingernail 21 with a red light. A photo-detector 25 is mounted on one side of the light source 24 and catches the reflected light 23 from the area of the finger beneath the fingernail 21. In the embodiment of FIG. 2a, the photodetector 25 is a photo-transistor.

The behavior of the circuit in FIG. 2a will depend on the placement of the photodetector 25 with respect to the fingernail 21. As shown in FIGS. 1a–1d, there is a region of the finger beneath the fingernail which becomes darker red in color with increasing contact pressure ("reddening zone") and a region of the finger beneath the fingernail which forms a white band ("whitening zone") with an increase in contact pressure. First, the behavior of the circuit when measuring the color change in the "reddening" zone of the nail is discussed. As contact pressure on the finger 20 is increased, more arterial blood accumulates under the fingernail 21 resulting in two phenomena. Firstly, the additional volume of blood under the fingernail 21 increases the effective path length over which the light is absorbed which tends to increase the absorption of light and, therefore, reduce the amount of reflected light. Secondly, the increase in oxygen saturation of the blood underneath the fingernail decreases the absorption coefficient of the blood which tends to decrease the absorption of light. In a preferred embodiment, the phenomena caused by the increase in blood volume underneath the fingernail 21 is measured. As the contact pressure on finger 20 increases, the volume of blood underneath the fingernail 21 also increases. As the volume of blood increases, more light is absorbed and less red light is reflected. As a result, the impedance of the photo-transistor 25 drops and the output, Vout, increases.

If, however, the photodetector 25 is measuring the color change in the "whitening" zone (See FIGS. 1c and 1d) of fingernail 21, Vout will decrease with increasing contact pressure. As described above with respect to FIG. 1c, as the force applied to the finger 20 is increased, the arterial blood supply at the tip of the finger will be constricted causing blood to be pushed out of the region, resulting in a decrease in the volume of blood underneath the fingernail 21. As the blood underneath the fingernail 21 in this region is decreased, the absorption of light is also decreased. As a result, Vout will decrease with increasing contact pressure in the "whitening" zone.

Figure 2B:
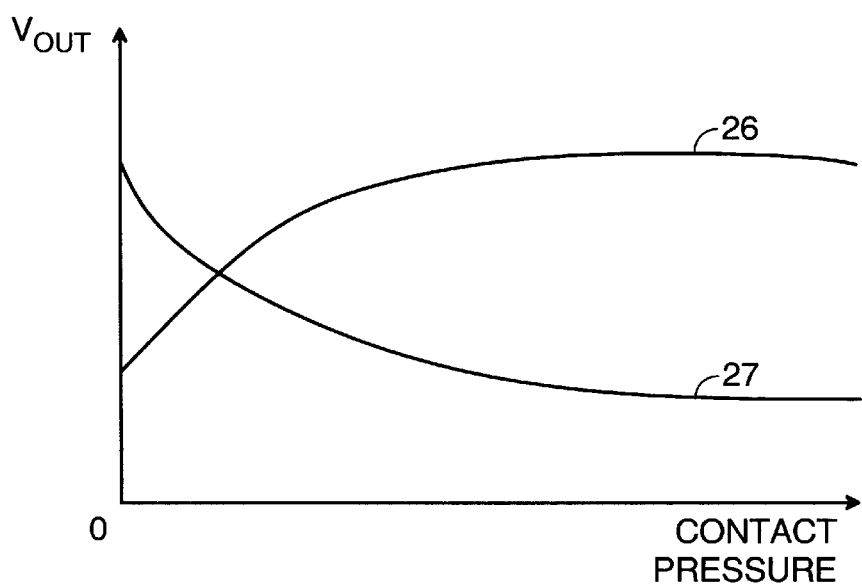
FIG. 2b schematically shows a graphical representation of the output voltage of a photo-detector as a function of contact pressure when using either the circuit as shown in FIG. 2a or the circuit as shown in FIG. 4.

FIG. 2b is a graphical representation of the output voltage, Vout, of the photodetector 25 as a function of the contact pressure applied to the finger 20. FIG. 2b demonstrates the trends in the behavior of Vout as described above. In the "reddening" zone, Vout tends to increase with increasing contact pressure as shown by curve 26. In the "whitening" zone, Vout tends to decrease with increasing contact pressure as shown by curve 27. In both cases, however, will reach an asymptotic value when the veins are collapsed and closed shut. The above described information can be used to determine if a contact pressure is applied to the finger 20.

Figure 3:
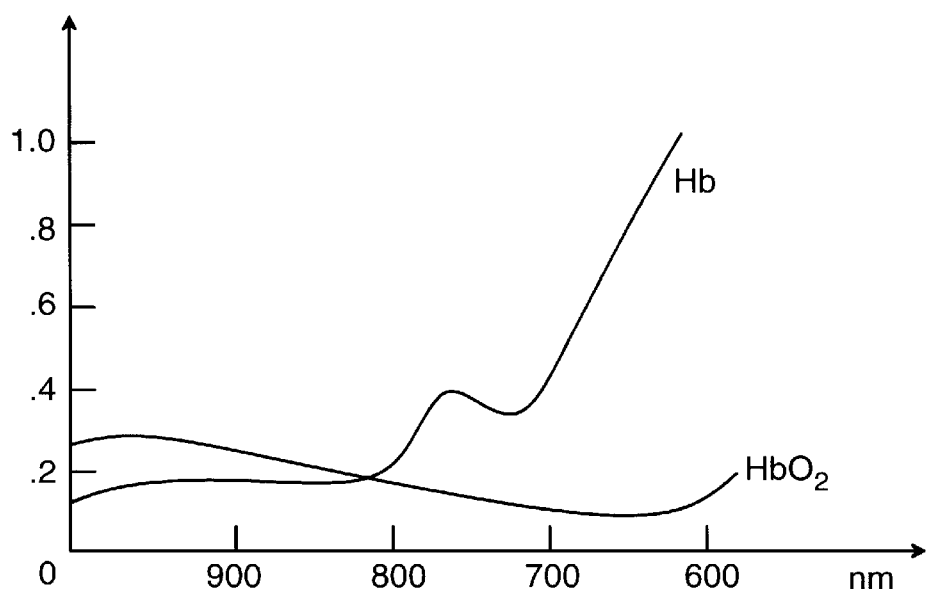
FIG. 3 schematically shows a graphical representation of the absorption curves for hemoglobin and oxy-hemoglobin.

In an alternative embodiment, an infrared LED at 940 n.m. is used as the light source 24. In this embodiment, the output voltage, Vout, increases with the contact pressure at a larger rate. This is because the trends of the absorption curves for hemoglobin and oxy-hemoglobin reverses after crossing the isobestic point at 800 n.m., as shown in FIG. 3. At 940 nm, an increase in oxygen saturation will result in a larger coefficient of absorption. If a high contact pressure is applied, the increase in effective path length caused by the increase in blood volume and the increase in coefficient of absorption caused by the increase in oxygen saturation will work together to increase the absorption of light and decrease the reflected infrared light at 940 nm. As a result, the output voltage, Vout, will increase.

In a further embodiment, the red LED at 660 nm and the infrared LED at 940 nm can be used in the same sensor to measure relative concentration of oxygen in the blood and enhance the sensor sensitivity. The two types of LED's are illuminated alternately and the reflected lights are measured by the same photo-detector with the aid of sample-and-hold circuitry. In yet another further embodiment, a third LED at the isobestic wavelength may be used to provide measurements of the absorption of light that are decoupled from the effect of oxygen concentration.

Figure 4:
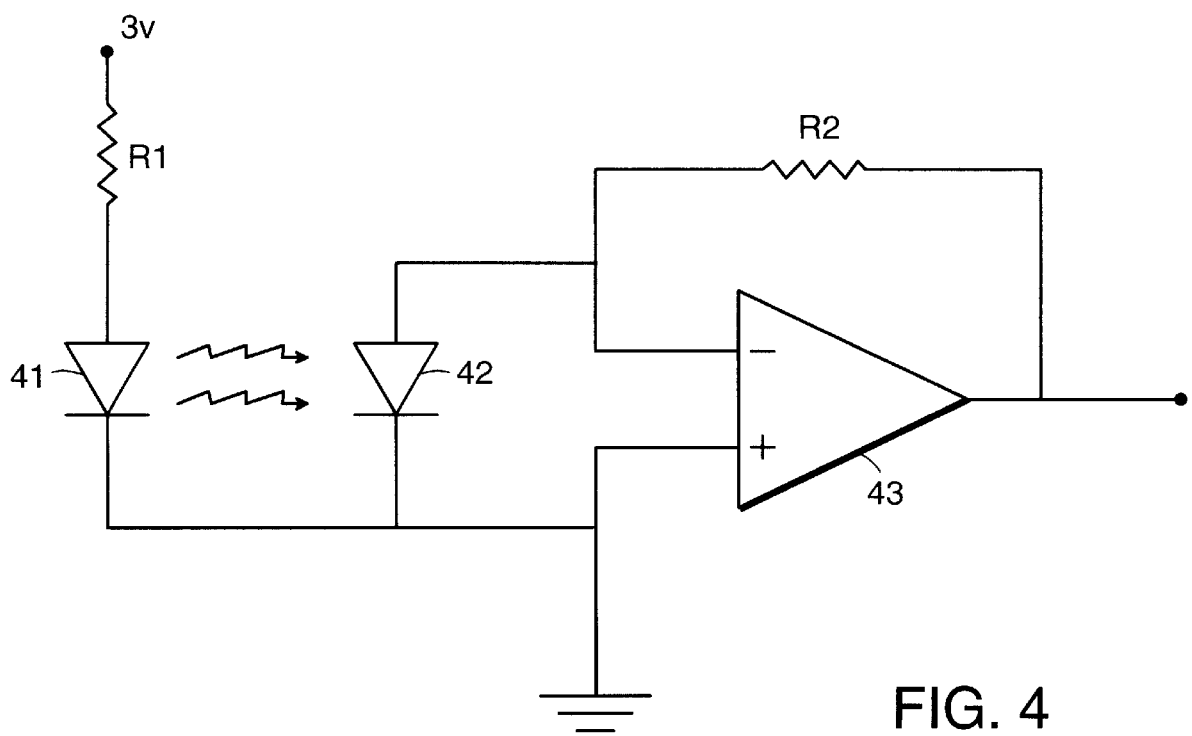
FIG. 4 schematically shows a fingernail touch sensor circuit that may be utilized in accordance with a preferred embodiment of the invention.

FIG. 4 schematically shows a touch sensor circuit in accordance with a preferred embodiment of the invention. A photodetector 42 is coupled to a light source 41. In this embodiment, the photodetector 42 is a photodiode. In one embodiment, the light source 41 is a light emitting diode. Photodetector 42 is coupled to the inputs of an operational amplifier 43. The output, Vout, is measured at the output of operational amplifier 43. The trends in the behavior of Vout in response to contact pressure applied to a finger, are the same as described above with respect to FIG. 2a.

Figure 5:
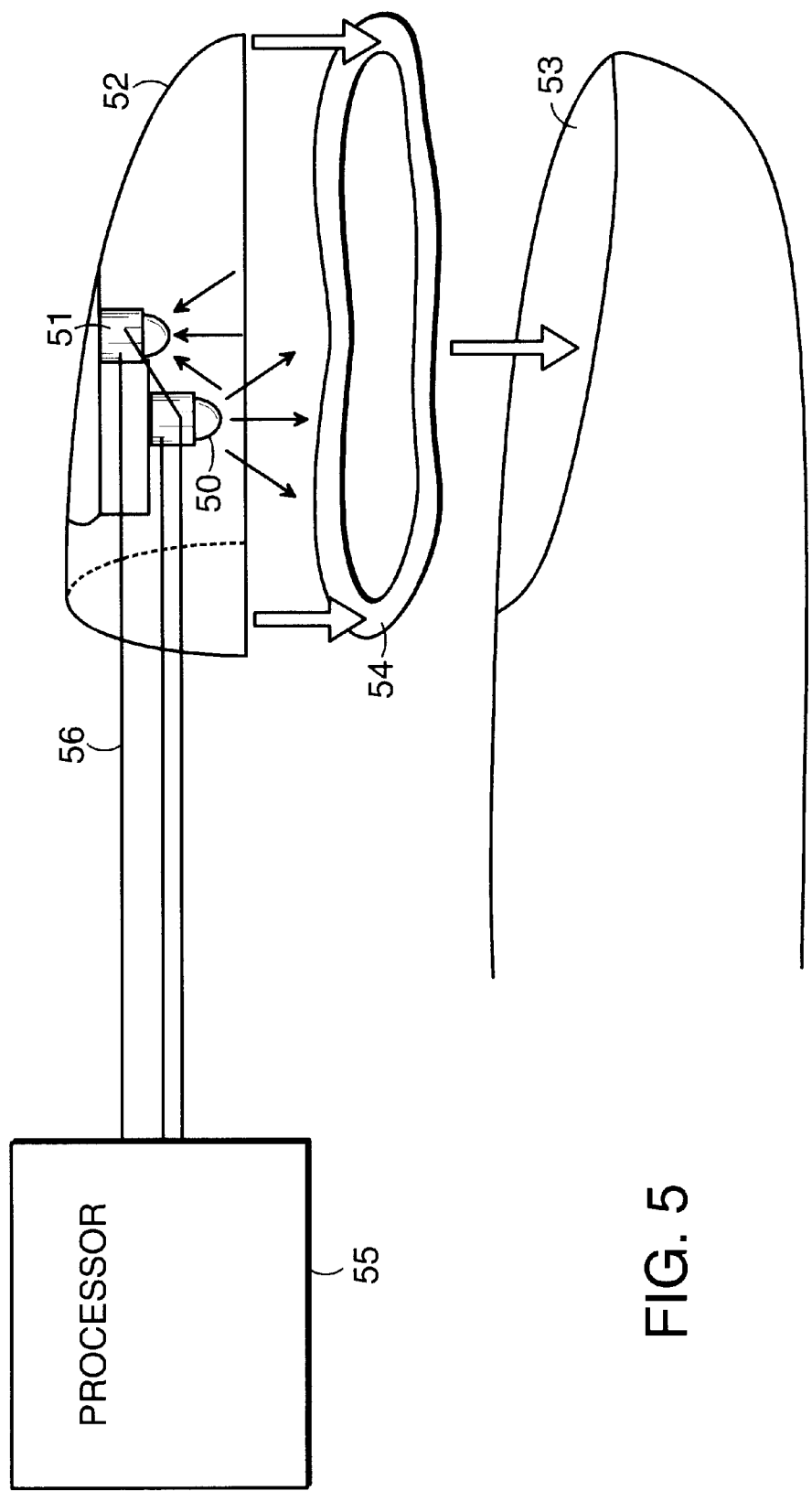
FIG. 5 schematically shows a device for detecting contact pressure applied to a finger in accordance with an embodiment of the invention.

FIG. 5 schematically shows a device for detecting contact pressure applied to a finger in accordance with a preferred embodiment of the invention. A light source 50 and a photodetector 51 are embedded in a housing 52. In a preferred embodiment, the housing is a prefabricated plastic fingernail. The housing 52 may be coupled to a fingernail 53 using a coupling element 54. In a preferred embodiment, a coupling element 54 is a thin strip of adhesive around the perimeter of the housing 52. In an alternative embodiment, the coupling element 54, may be an transparent adhesive applied to the entire fingernail 53 through which light may be transmitted.

The light source 50 emits light into the fingernail 53. In one embodiment, the light source 50 may be natural light. In another embodiment, the light source 50 may be a light emitting diode (LED) such as a red LED at 660 nm or an infrared LED at 940 nm. In a preferred embodiment, the light source is an array of LEDs of differing wavelengths such as 660 nm, 770 nm, and 940 nm. By using different wavelengths of LED's both the change in the volume of blood and the relative concentration of oxygen in the blood may be measured. The photo-detector 51 is coupled to the light source 50 and measures the light reflected by the area of the finger beneath the fingernail 53. In one embodiment, the photo-detector 51 is a photo-transistor. In a preferred embodiment, the photodetector 51 is a photodiode. In a preferred embodiment, the photo-detector 51 is an array of photo detectors which has a broad spectral range across the visible and the infrared in order to measure the pattern of color change visible through the fingernail 53.

The photo-detector 51 provides a signal with information corresponding to the change in reflected light in response to contact pressure applied to the finger. The signal is received by a processor 55. The processor 55 determines whether the change measured by the photodetector corresponds to a specified condition indicating that contact pressure has been applied to the finger. In the touch sensor circuit configurations as described above with respect to FIGS. 2a and 4, for example, the output voltage of the circuit increased as the contact pressure increased. Returning to FIG. 5, in one embodiment, the processor 55 may receive the signal of the photodetector via wires 56. In an alternative embodiment, the processor 55 may receive the signal from the photodetector 51 via wireless transmission.

Figure 6:
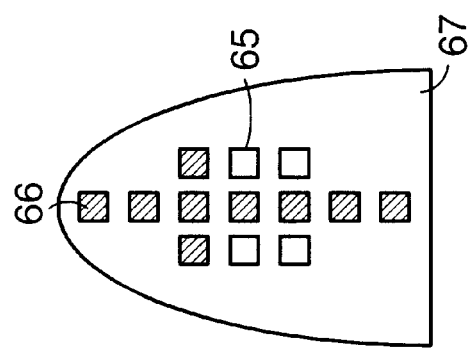
FIG. 6 schematically shows a device for detecting contact pressure applied to a finger in accordance with a preferred embodiment of the invention.
Figure 6:
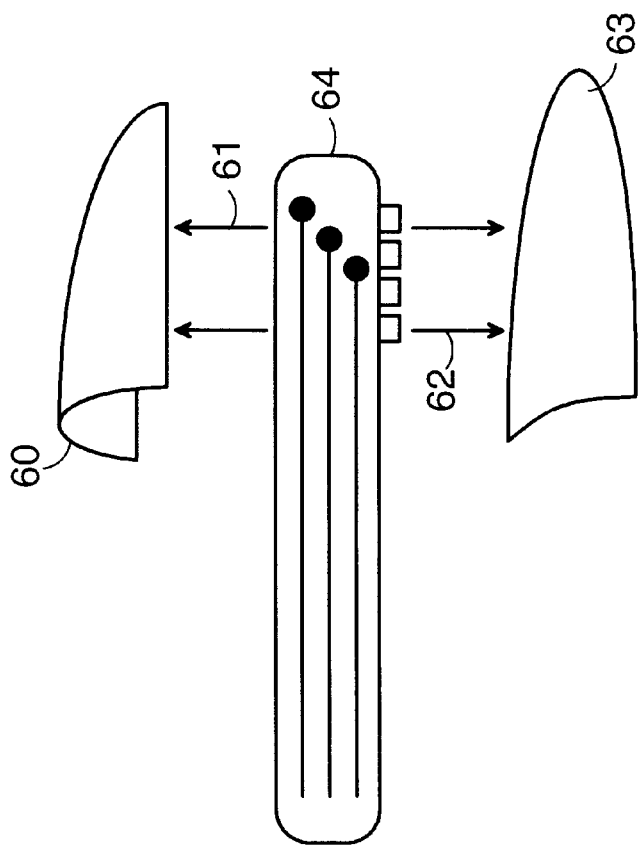

FIG. 6 schematically shows a device for detecting contact pressure applied to a finger in accordance with a preferred embodiment of the invention. In FIG. 6, the layout 67 of the optical components is shown. A array of LED's 65 and an array of photodetectors 66 are used in the layout 67. In one embodiment, the array of LED's 65 includes LED's of different wavelengths, for example, 660 nm, 770 nm, and 940 nm. In another embodiment, the array of photodetectors 66 is an array of phototransistors having a broad spectral range. In a preferred embodiment, the array of photodetectors is an array of photodiodes with a broad spectral range. In FIG. 6, the array of photodetectors are placed along the longitudinal axis of a fingernail in order to measure the pattern of color change observable through the fingernail.

The array of LED's and the array of photodetectors are mounted on a flexible strip 64 which can be bent to the shape of a fingernail. The flexible strip is coupled to a housing 60 with an epoxy 61. In a preferred embodiment, the housing 60 is a prefabricated plastic fingernail. The flexible strip 64 is coupled to an optical epoxy 62 which is transparent to light and is used to couple the flexible strip 64 to a fingernail. The flexible strip 64 is molded to the shape of a fingernail using a fingernail mold 63. The flexible strip 64 is coupled to the fingernail mold 63 with the optical epoxy 62. The fingernail mold 63 is removed before placing the flexible strip 64 on a fingernail. The optical epoxy 62 will couple the flexible strip 64 to the fingernail.

The device for detecting contact pressure applied to a finger preferably is suited for miniaturization. Most of the primary components, including LED and photo detectors, may be less than 1 m.m. square in size and can be mounted on fingernails. The burden on the wearer thus is minimized, and the sensors can be worn comfortably for a long period of time. These features should facilitate development of novel human machine interface and interactive control methods that would otherwise be impractical and infeasible.

Figure 7:
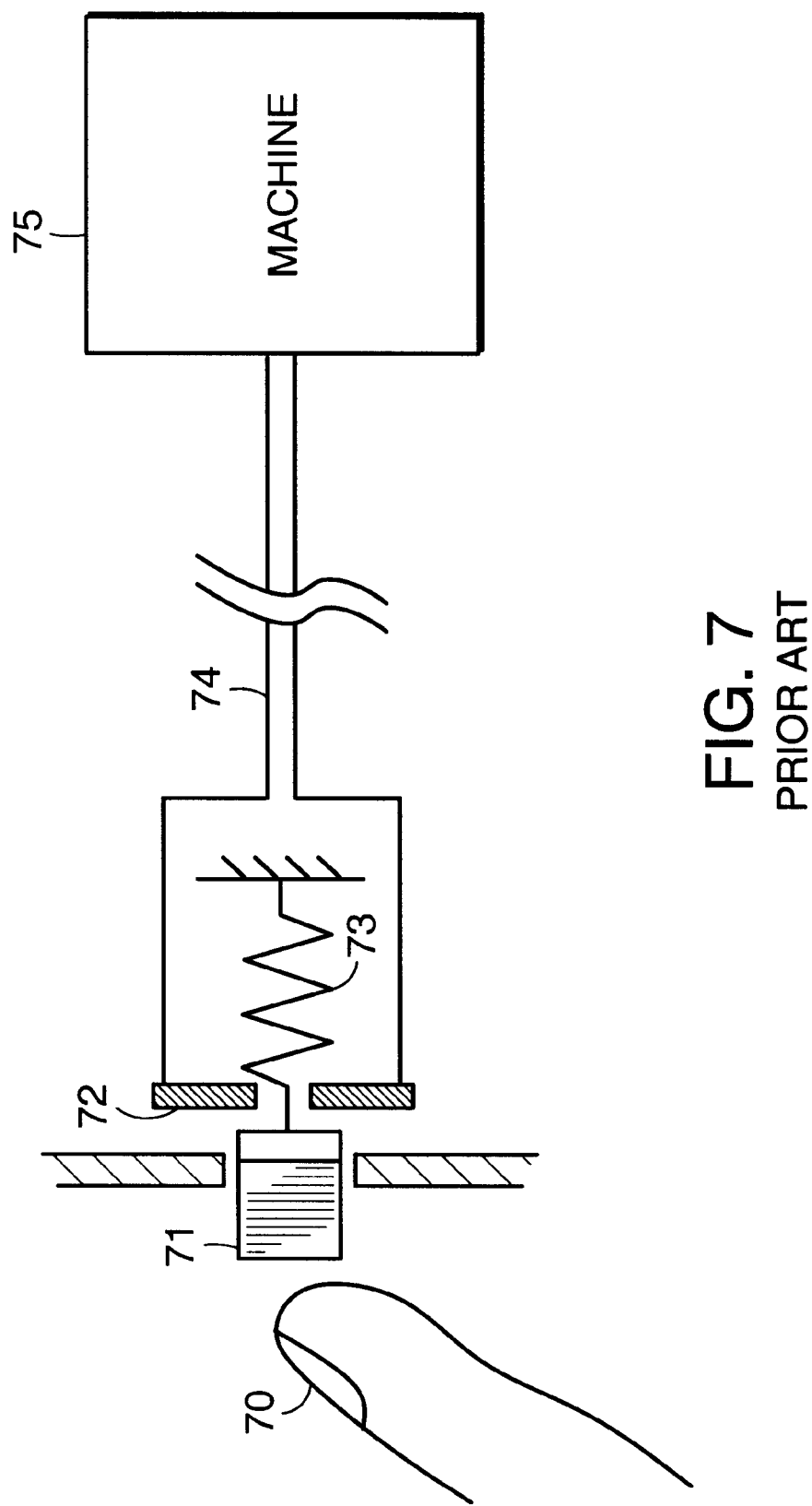
FIG. 7 schematically shows a traditional switch.

The above described sensors may be utilized in many applications. For example, the sensor may be utilized as a virtual switch. More particularly, in the home and work environment, people are constantly supervising, controlling, and communicating with devices, computers and machines using a multitude of switches. Switches are rudimentary means for people to communicate their intention to machines. The disclosed sensor replaces the traditional switches and enhances the human-machine interface. By way of contrast, FIG. 7 depicts the functionality of a traditional switch. The traditional switch works by means of the person's movement of his/her finger 70 to physically push the knob or button 71 of the switch. The electrical contact 72 in the switch detects the pressure applied by the person's finger 70 on the button 71. The detected signal is then transferred through mechanical parts 73 and circuit 74 to a specific part of a machine 75 to change its state.

Accordingly, with the traditional switch, the detection of human intention is performed by the device that is attached to the machine and that is physically connected to a specific part of the machine. Among other things, traditional switches have the following limitations: 1) they wear and need repairs/replacement; 2) they can be damaged in hazardous environments—chemical, mechanical, etc . . . ; 3) they can be activated accidentally if bumped; 4) they generally cannot be reconfigured without reinstalling; and, 5) they take up space which could be used for some other purpose.

Figure 8:
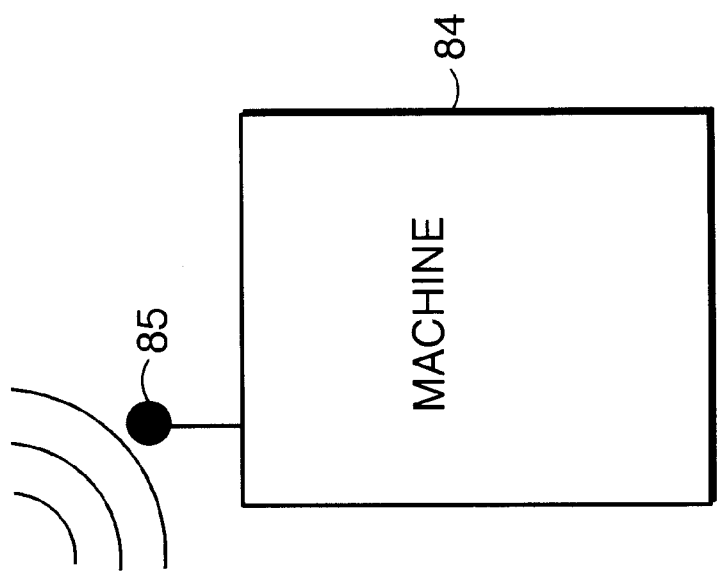
FIG. 8 schematically shows touch sensors implemented as a virtual switch in accordance with an embodiment of the invention.
Figure 8:
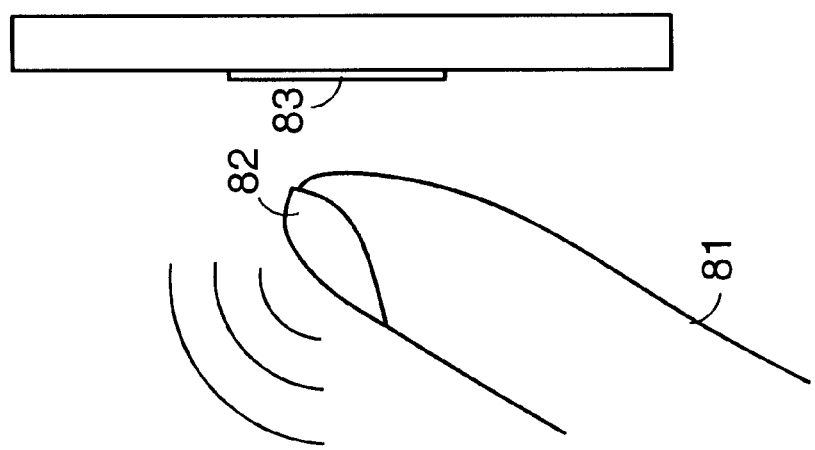

The fingernail touch sensor as described above may be used to measure human intention through touch without changing the environment. The detection of human intention can be performed by a device (i.e., the fingernail touch sensor) worn by a person rather a device attached to the machine. To this end, the touch sensor may be implemented as a "virtual switch" as shown in FIG. 8. The virtual switch is not a mechanical mechanism, but is an image on a surface 83 that represents a switch. The switch is activated by the fingernail touch sensor 82 which is attached to a finger 81. The fingernail touch sensor 82 sends a signal via a transmitter to a receiver 85 coupled to the machine 84. The signal received by the machine 84 indicates that the finger 81 has applied pressure to the switch image 83. The use of the fingernail touch sensor can eliminate the problems noted above and open up new possibilities for human-machine communication.

Figure 9A:
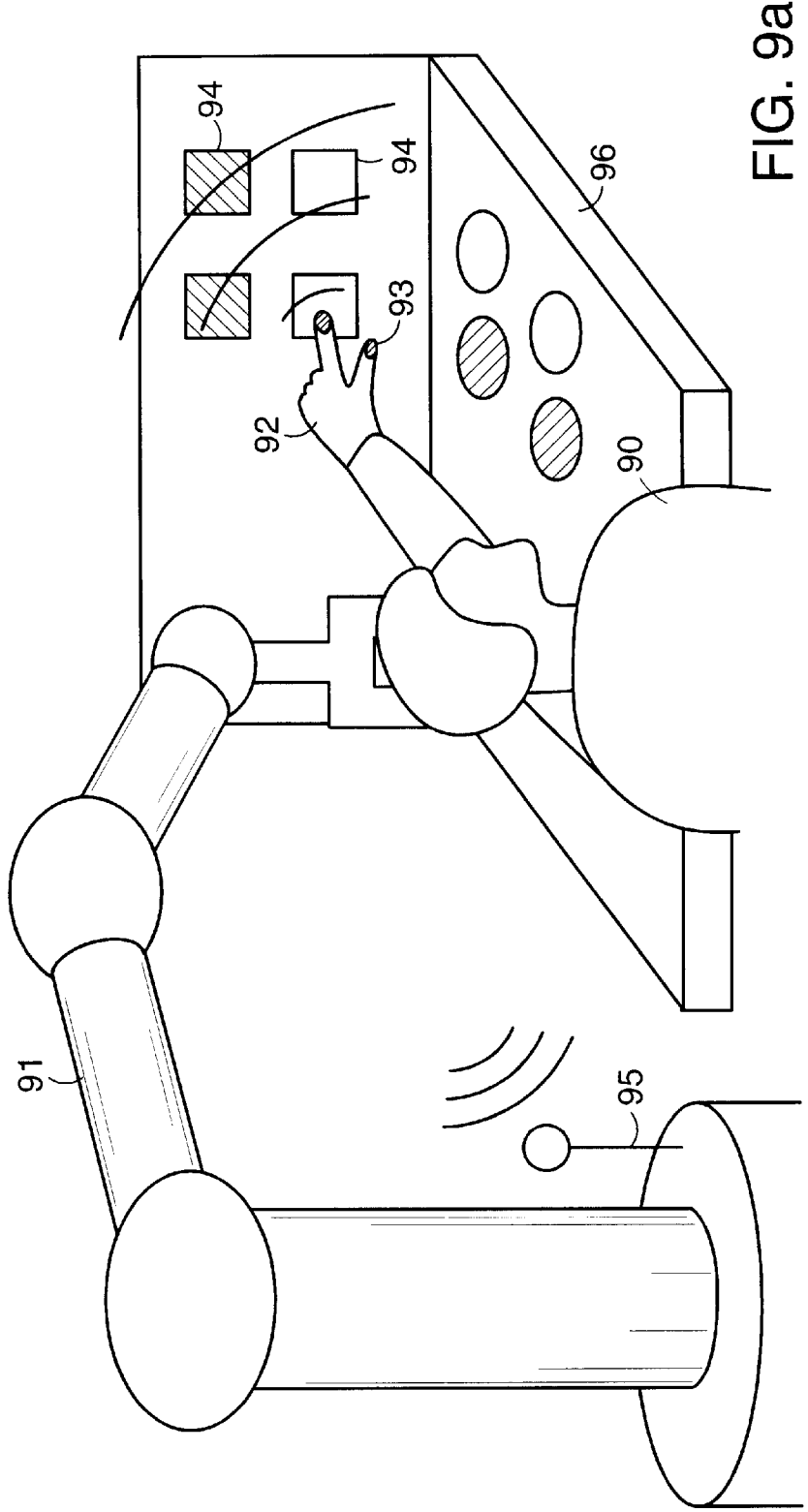
FIG. 9a schematically shows a sketch of one embodiment of a virtual switch panel in accordance with an embodiment of the invention.

FIG. 9a shows a sketch of one embodiment of a virtual switch panel in accordance with an embodiment of the invention. In this embodiment, a person 90 is working alongside a robot 91 to accomplish a task. The person is wearing some form of data glove 92 with open fingertips, which tracks the position of his fingers in 3-D space. The person's fingernails are instrumented with fingernail touch sensors 93, as described above, to measure finger touch force. The data glove 92 may be one of general use in the art for tracking the position of a person's hand or fingers. Virtual switches 94 are painted on the surfaces around the work space as well as the surface of the 96 work space. In an alternative embodiment, switches may even painted on the robot 91 or human 90. Whenever a fingernail sensor 93 detects a sudden touch force, it relays a signal to a computer or robot controller 95. The data glove provides a signal corresponding to the position of the finger that committed the touch. If the computer 95 recognizes that the position corresponds to a certain virtual switch, then that switch is declared "activated." The function associated with the switch is performed, and the computer 95 provides feedback to the human audibly or otherwise to confirm the activation of the switch. In this way, the person 90 can activate the robot 91, the computer, or other devices in his work area without changing the environment. Furthermore, the functions of each of the switches can be reprogrammed by the person at any time without having to do mechanical work.

The virtual switches 94 can even take on different functions at different stages of a task, or have different functions depending on which finger activates them. In a manner similar to a computer mouse with two buttons, different actions can be recognized by using multiple finger touch sensors attached to different fingers. Finally, the person can work over top of the virtual switches and use the desk for other tasks without the switches getting in the way.

Figure 9B:
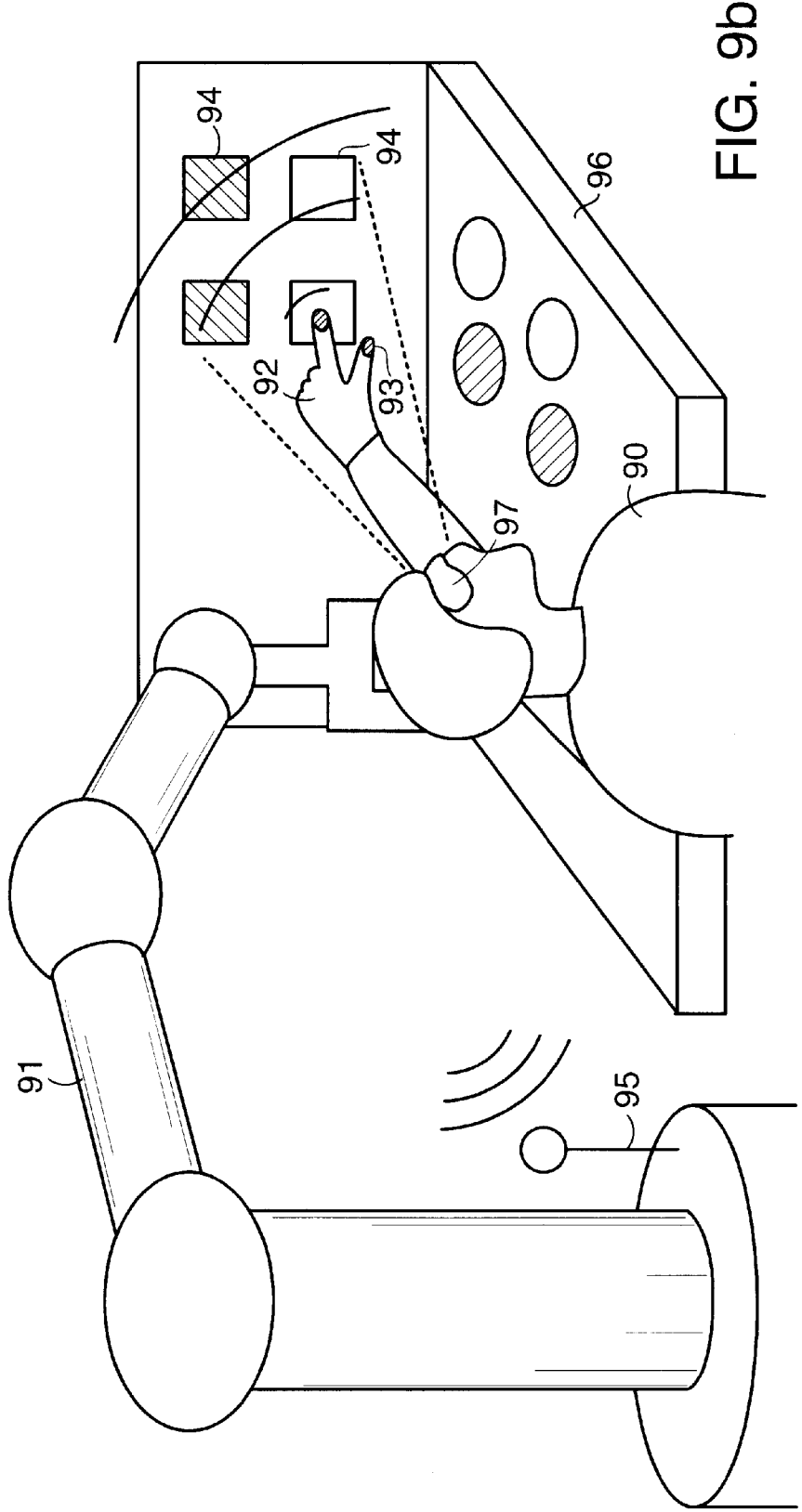
FIG. 9b schematically shows a sketch of another embodiment of a virtual switch panel in accordance with an embodiment of the invention.

FIG. 9b shows the another embodiment of the invention in which the switch panel is entirely virtual. This embodiment includes all the features of the prior noted virtual switch panel in FIG. 9a, only in this case the switches are not painted or drawn on the surfaces of the work space. Instead, the switches may be either projected onto the work space, or the person may wear a head-mounted, heads-up display 97, which superimposes computer images of the virtual switches 93 on the view of the work space. By tracking head motion, the images can be made to appear stationary on a particular surface or move around in a desired fashion. The virtual switches 93 may be rearranged and reconfigured completely by software.

As is evident to those skilled in the art, the above noted virtual switch panel includes a number of advantages over traditional switch boards having traditional switches. Among those advantages are that: 1) virtual switches do not wear and do not require repairs/replacement; 2) virtual switches cannot be damaged in hazardous environments—chemical, mechanical, etc . . . ; 3) virtual switches cannot be activated accidentally if bumped; 4) virtual switches can be rearranged and reconfigured without reinstalling; 5) virtual switches can have different functions for different fingers; and, 6) virtual switches can share the work space and do not monopolize a work surface.

The concept of the virtual switch panel opens up numerous possibilities for human-machine communication, and can be anything from a simple virtual on-off button to an entire virtual computer keyboard. Virtual switches can be placed at diverse surfaces including: 1) Walls, like light switches; 2) Control panel and remote switch box; 3) Tables, chairs and other furnishing; and, 4) The body of the machine itself.

The described embodiments of the invention are intended to be merely exemplary and numerous variations and modifications will be apparent to those skilled in the art. All such variations and modifications are intended to be within the scope of the present invention.

We claim:

1. A device for detecting contact pressure applied to a finger, the finger having a fingernail illuminated by light, the device comprising:

at least one photodetector for measuring a change in light reflected by an area of the finger beneath the fingernail in response to the contact pressure applied to the finger and providing a signal corresponding to the change; and a processor for receiving the signal and determining whether the change corresponds to a specified condition.

2. A device according to claim 1, wherein the photodetector is an array of photodetectors, the array of photodetectors having a spectral range.

3. A device according to claim 2, wherein the spectral range includes visible and infrared wavelengths.

4. A device according to claim 1, further including at least one light source, coupled to the photodetector, the light source for emitting light into the fingernail.

5. A device according to claim 1, further including a set of light sources coupled to the photodetector, the set of light sources having varying wavelengths and for emitting light into the fingernail.

6. A device according to claim 1, further including:

a housing, enclosing the photodetector; and a coupling element, connected to the housing, the coupling element for coupling the housing to the fingernail.

7. A device according to claim 6, wherein the coupling element is a transparent adhesive material.

8. A device according to claim 1, further including:

a surface for providing contact pressure to the finger, the surface having indicia; and a position locator, in signal communication with the processor and coupled to the finger, the position locator for identifying the position of the finger with respect to the surface.

9. A method for detecting contact pressure applied to a finger, the finger having a fingernail illuminated by light, the method comprising:

providing at least one photodetector;

measuring a change in light reflected by an area of the finger beneath the fingernail in response to the contact pressure applied to the finger;

providing a signal corresponding to the change; and comparing the change to a specified condition.

10. A method according to claim 9, further including illuminating the fingernail with light from a light source.

11. A method according to claim 10, further including:

enclosing the photodetector and the light source in a housing; and coupling the housing to the fingernail.

* * * * *